(12) United States Patent
Tseng et al.

(10) Patent No.: US 6,922,382 B2
(45) Date of Patent: Jul. 26, 2005

(54) METHOD FOR ADJUSTING THE WRITE SPEED OF DATA RECORDING DEVICE AND APPARATUS THEREOF

(75) Inventors: Hsien-Yu Tseng, Taipei (TW); Shih-Chieh Lee, Ilan (TW); Ching-Hwa Liu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 348 days.

(21) Appl. No.: 10/357,426

(22) Filed: Feb. 4, 2003

(65) Prior Publication Data

US 2003/0165097 A1 Sep. 4, 2003

(30) Foreign Application Priority Data

Mar. 4, 2002 (TW) ........................................ 91103934 A

(51) Int. Cl.⁷ ................................................ G11B 5/09
(52) U.S. Cl. .................................. 369/47.33; 369/53.12
(58) Field of Search ............................ 369/47.29, 47.3, 369/47.32, 47.33, 47.34, 53.12, 53.31, 53.34, 53.42, 53.44, 124.14

(56) References Cited

U.S. PATENT DOCUMENTS 6,115,337 A * 9/2000 Takagi et al. ............. 369/47.33
6,347,380 B1 * 2/2002 Chang et al. ................ 713/503

FOREIGN PATENT DOCUMENTS

CN          1187669 A       7/1998
CN          1252601 A       5/2000

* cited by examiner

*Primary Examiner*—Paul W. Huber
(74) *Attorney, Agent, or Firm*—Birch, Stewart, Kolasch & Birch, LLP

(57) ABSTRACT

A method for adjusting the write speed of a data recording device and apparatus thereof. First, the recording media is written to at a write speed, during which the number of buffer underrun events is counted. Then, the write speed is adjusted according to the number of buffer underrun events until writing is finished.

20 Claims, 4 Drawing Sheets

METHOD FOR ADJUSTING THE WRITE SPEED OF DATA RECORDING DEVICE AND APPARATUS THEREOF

BACKGROUND OF THE INVENTION

1. Field of the Invention

The present invention relates to a method for adjusting the write speed of data recording devices and apparatus thereof, and particularly to a method for adjusting the write speed of data recording devices and apparatus thereof that dynamically sets the write speed according to the number of buffer underrun events when writing to the recording media.

2. Description of the Related Art

Recently, optical storage media, such as compact disc (CD) and recordable compact disc (CD-R and CD-RW) have a significant standing in the evolution of data storage media. With the development of optical storage media, data can be recorded and backed up into high capacity and light discs, and the optical storage media will take the place of traditional data storage media.

FIG. 1 shows the block diagram of a disc servo system. The optical head 11 reads reflection signal from the disc 10. After the signal is amplified and processed by the RF (Radio Frequency) IC 12, the FE (Focus Error) signal, TE (Track Error) signal and relative data and signals are inputted to DSP (Digital Signal Processor) and micro processor 13.

Then, the micro processor 13 computes servo driver signals by analyzing the received data, and outputs the signals to corresponding servos (Focusing Servo 14, Tracking Servo 15 and Spindle Motor Servo 16) for controlling the actuators (focusing actuator 17, tracking actuator 18, sled motor 19 and spindle motor 20) to ensure the accuracy when reading or writing (recording) data.

In the process of writing recordable discs, the data recording device always gradually raises its write speed from lower speed to the maximum write speed or user defined speed according to the preset time regions. FIG. 2 shows the variation of write speed of conventional data recording devices. As shown in FIG. 2, the write speed is 16 in the time region 0~t1, the write speed is raised from 16 to 20 in the time region t1~t2, the write speed is raised from 20 to 24 in the time region t2~t3 and after time t3, the write speed is raised from 16 to the maximum write speed 32 and kept until recording finish.

In the writing process, data is sent from the hard disk or the CD-ROM drive to the host via IDE (Integrated Drive Electronics) interface at first, then the data is sent to the buffer memory of the data recording device via SCSI (Small Computer System Interface) or IDE interface. Finally, the data recording device writes the data stored in the buffer memory to the recordable disc. Since the data is successively stored on the disc, the writing process of the data recording device must be continuous and no interrupt is allowable. If only one link breaks down, the writing process fails, thus the recordable disc has to be discarded.

One reason for writing failure is buffer underrun, that is the data in buffer memory is insufficient. There are various causes of buffer underrun, such as sectors on the hard disk being distributed in a disorderly fashion, insufficient available space on the hard disk, execution speed of the computer system not fast enough, the read speed of data and the write speed of the data recording device not being identical, or the imperfection of the recordable disc, and others.

A conventional solution to solve buffer underrun is to monitor the state of the buffer. If the data received by the buffer is not enough, the writing process is suspended and the system will register the location. The writing process will reinstate when the data of the buffer is full again.

However, the conventional solution only writes data segments several times, and the causes of buffer underrun are not yet solved. Relocating the optical head to the registered location in the conventional solution will lengthen the whole writing process and consume the lifespan of the data recording device.

SUMMARY OF THE INVENTION

It is therefore an object of the present invention to provide a method for adjusting the write speed of data recording devices and apparatus thereof that dynamically sets the write speed according to the number of buffer underrun events when writing to the recording media, so as to reduce the number of buffer underrun events.

To achieve the above object, a method for adjusting the write speed of data recording devices according to the embodiment of the invention is provided. First, the recording media is written to at a first write speed. Then, the number of buffer underrun events is counted. If the number of buffer underrun events is larger than a preset value, the first write speed is decreased to a second write speed, and then the recording media is written to at the second write speed.

Further, if the number of buffer underrun events is not larger than the preset value in a preset time region, the first write speed is raised to a third write speed, and then the recording media is written to at the third write speed.

According to the embodiment, the data recording device may be CD-R ROM or CD-RW ROM, and the recording media may be CD-R or CD-RW.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1:
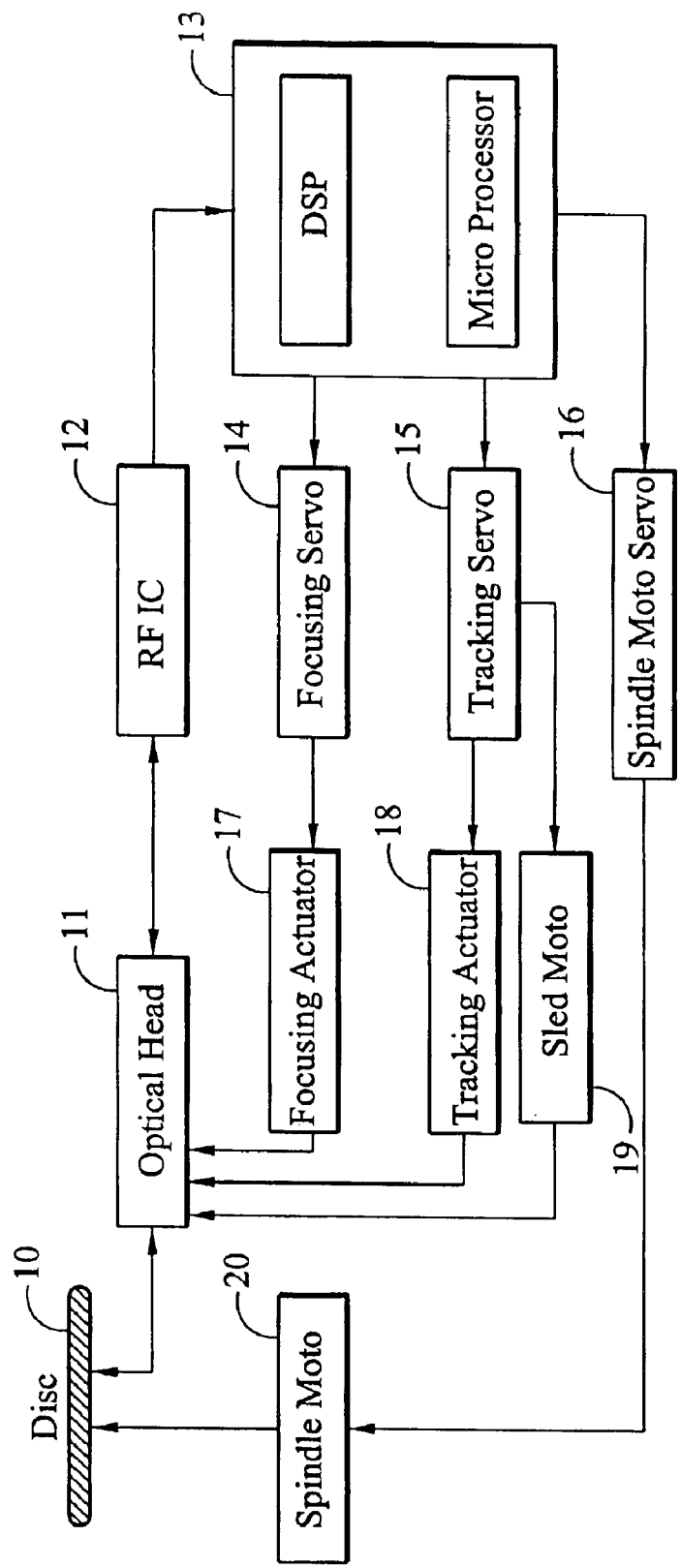
FIG. 1 is a block diagram showing the system architecture of a disc servo system.
Figure 2:
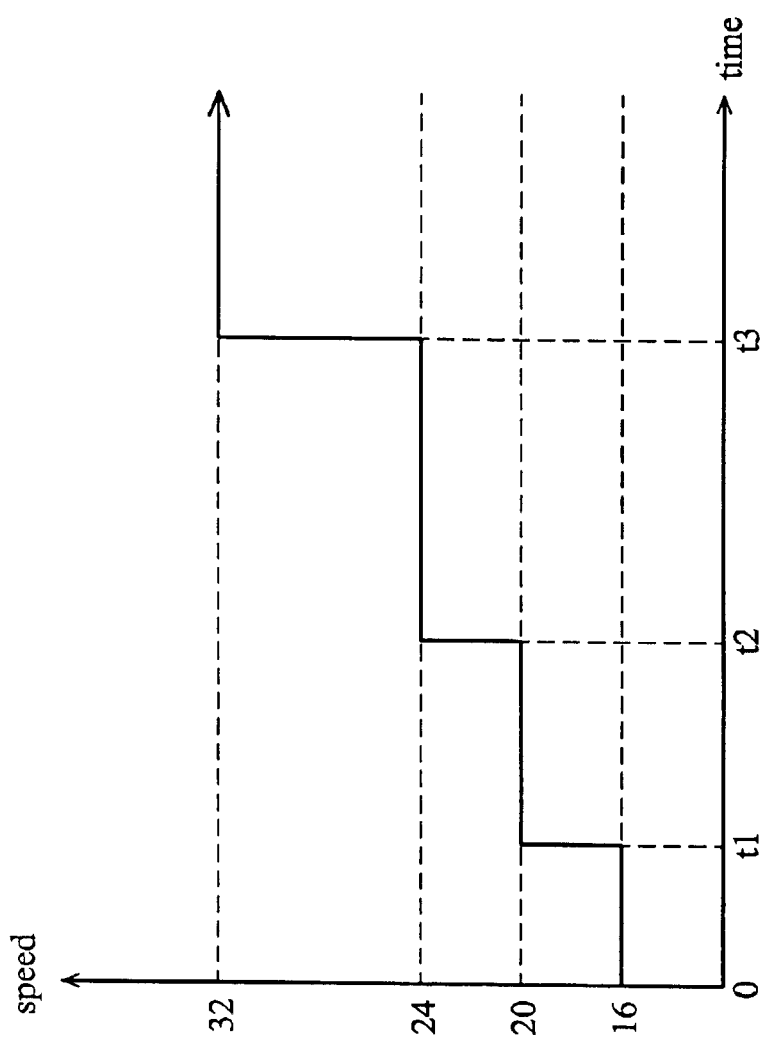
FIG. 2 shows the variation of write speed of conventional data recording devices.
Figure 3:
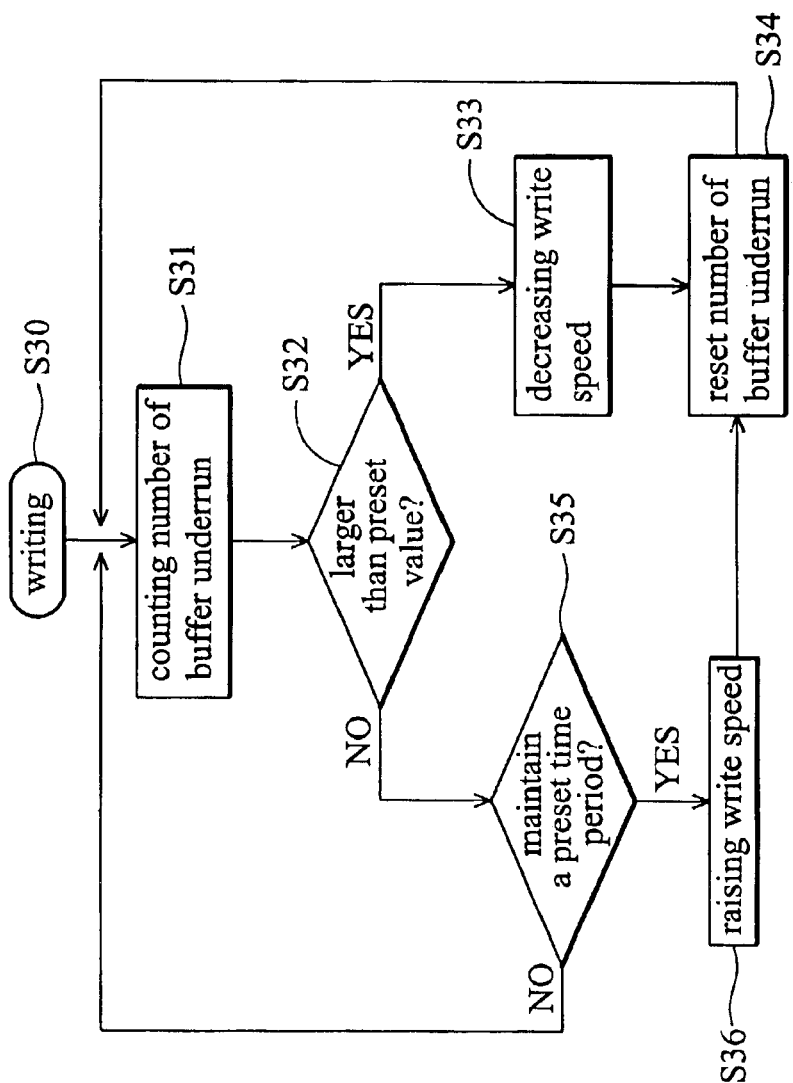
FIG. 3 is a flow chart illustrating the operation of a method for adjusting the write speed of data recording devices according to the embodiment of the present invention.

FIG. 3 shows the operation of a method for adjusting the write speed of data recording devices according to the first embodiment of the present invention. The method for adjusting the write speed of data recording devices according to the embodiment of the present invention is suitable for use in data recording devices, such as CD-R ROMs and CD-RW ROMs.

First, in step S30, the recording media is written to at a first write speed. The recording media may be a CD-R or CD-RW. Then, in step S31, the number of buffer underrun events is counted.

It should be noted that the writing process can avoid failure by employing various mechanisms if buffer underrun occurs. For example, if buffer underrun occurs, the data recording device suspends writing and registers the location on the recording media where the writing process is suspended. Thereafter, the data recording device resumes writing from the location if the data of the buffer memory comes to a preset ratio.

Then, in step S32, the number of buffer underrun events is compared to a preset value. The preset value is dependent on recording media, data recording devices and time regions. If the number of buffer underrun events is larger than the preset value (YES in step S32), the first write speed is decreased to a second write speed (step S33), and the number of buffer underrun events is reset (step S34). Afterward, the data recording device writes to the media at the second write speed.

If the number of buffer underrun events is not larger than the preset value (NO in step S32), it is determined whether the condition that the number of buffer underrun events is not larger than the preset value can be maintained over a preset time period (step S35). If the condition cannot be maintained over the preset time period, the flow will return to step S31 and continue to count the number of buffer underrun events. If the condition can be maintained over the preset time period, the first write speed is raised to a third write speed (step S36), and the number of buffer underrun events is reset (step S34). Afterward, the data recording device writes to the media at the third write speed.

Figure 4:
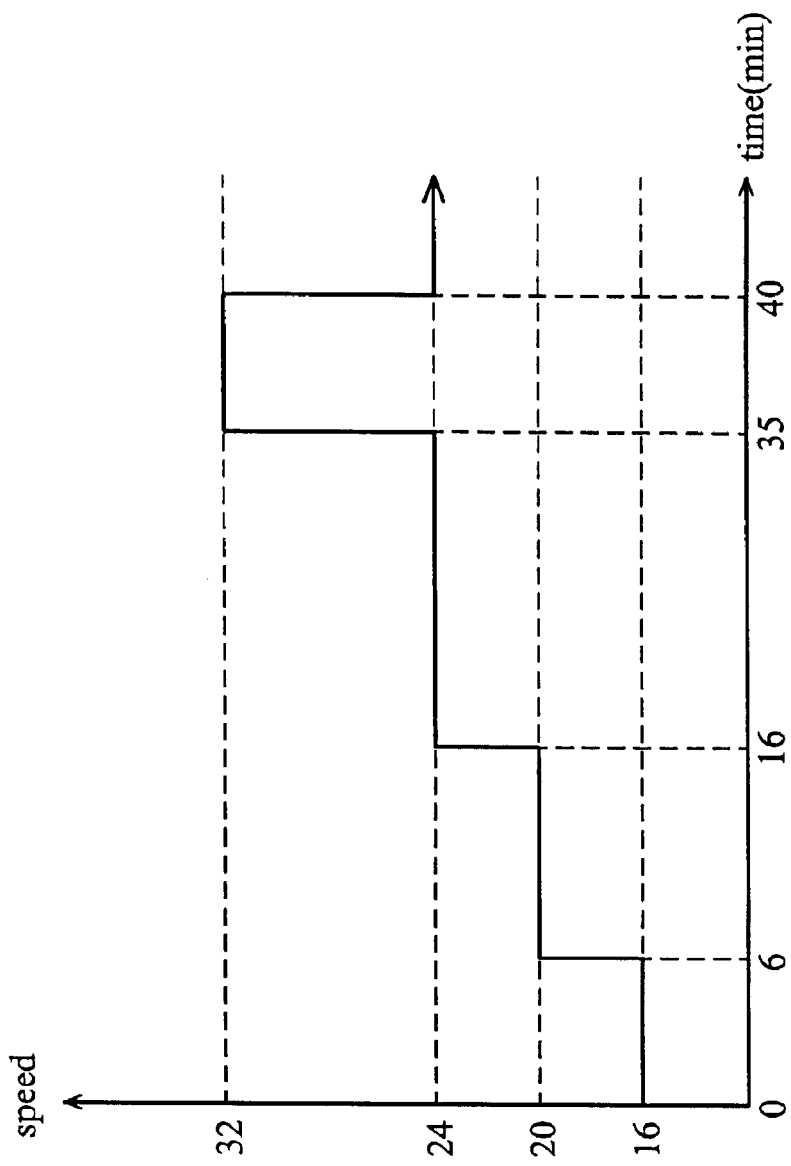
FIG. 4 is an example showing the variation of write speed of data recording devices according to the embodiment of the present invention.

FIG. 4 is an example showing the variation of write speed of data recording devices according to the embodiment of the present invention.

At first, the data recording device writes to the media at a write speed of 16. Since there is no buffer underrun or the number of buffer underrun events is not larger than 3 (the preset value of the time region 0–6 minute is 3), the write speed of the data recording device is raised to 20, and the number of buffer underrun events is reset to 0. Afterward, the data recording device writes to the media at the write speed of 20.

Thereafter, since there is no buffer underrun or the number of buffer underrun events is not larger than 4 (the preset value of the time region 6–16 minute is 4) when writing at the write speed of 20, the write speed of the data recording device is raised to 24, and the number of buffer underrun events is reset to 0. Afterward, the data recording device writes to the media at the write speed of 24.

Similarly, since there is no buffer underrun or the number of buffer underrun events is not larger than 5 (the preset value of the time region 16–35 minute is 5) when writing at the write speed of 24, the write speed of the data recording device is raised to 32, and the number of buffer underrun events is reset to 0. Afterward, the data recording device writes to the media at the write speed of 32.

The number of buffer underrun events is increased when writing at the write speed of 32. Since the number of buffer underrun events is larger than 6 (the preset value of the time region after 35 minute is 6) at time 40, the write speed of the data recording device is decreased to 24, and the number of buffer underrun events is reset to 0. Afterward, the data recording device writes to the media at the write speed of 24.

Note that if the number of buffer underrun events still increases, the number of buffer underrun events is further assessed to adjust the write speed according to the preset value of time region 16–35 minute.

According to another embodiment, a data recording device with the ability to adjust the write speed is also provided. The method for adjusting the write speed of data recording devices according to the invention can be applied in the apparatus (data recording device). The micro processor may control the write speed of a write component in the data recording device according to the mechanism described in the first embodiment. The write component may include the optical head, servomotors, and others. The operation of the data recording device is similar to the procedures discussed in the first embodiment, and the operation is omitted here.

As a result, using the method for adjusting the write speed of data recording devices and apparatus thereof, the write speed can be dynamically adjusted according to the number of buffer underrun events when writing to the recording media, so as to reduce the number of buffer underrun events.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for adjusting the write speed of a data recording device, comprising the steps of:
   writing to recording media at a first write speed;
   counting the number of buffer underrun events; and
   decreasing the first write speed to a second write speed if the number of buffer underrun events is larger than a preset value.

2. The method as claimed in claim 1 further suspending writing if buffer underrun occurs.

3. The method as claimed in claim 2 further registering a location on the recording media where the writing process is suspended.

4. The method as claimed in claim 1 further writing at the second write speed after the second write speed is set.

5. The method as claimed in claim 1 further resetting the number of buffer underrun events after the second write speed is set.

6. The method as claimed in claim 1 further raising the first write speed to a third write speed if a condition that the number of buffer underrun events is not larger than the preset value is maintained over a preset time period.

7. The method as claimed in claim 6 further writing at the third write speed after the third write speed is set.

8. The method as claimed in claim 6 further resetting the number of buffer underrun events after the third write speed is set.

9. The method as claimed in claim 1 wherein the data recording device is CD-RW ROM.

10. The method as claimed in claim 1 wherein the recording media is CD-R.

11. A method for adjusting the write speed of a data recording device, at least the steps of:
   (a) writing to recording media at a write speed;
   (b) counting the number of buffer underrun events; and
   (c) adjusting the write speed according to the number of buffer underrun events.

12. The method as claimed in claim 11 wherein step (c) further comprises the steps of:
   decreasing the write speed if the number of buffer underrun events is larger than a preset value; and
   raising the write speed if a condition that the number of buffer underrun events is not larger than the preset value is maintained over a preset time period.

13. The method as claimed in claim 11 further repeating the steps (a) to (c) until writing is finished.

14. A data recording device, comprising:
   a write component; and
   a processor drives the write component to write recording media at a first write speed, count the number of buffer underrun events, and decrease the first write speed to a second write speed if the number of buffer underrun events is larger than a preset value.

15. The data recording device as claimed in claim 14 wherein the processor further suspends the write component to write if buffer underrun occurs.

16. The data recording device as claimed in claim 15 wherein the processor further registers a location on the recording media where the writing process is suspended.

17. The data recording device as claimed in claim 14 wherein the processor further drives the write component to write at the second write speed after the second write speed is set.

18. The data recording device as claimed in claim 14 wherein the processor further resets the number of buffer underrun events after the second write speed is set.

19. The data recording device as claimed in claim 14 wherein the processor further raises the first write speed to a third write speed if a condition that the number of buffer underrun events is not larger than the preset value is maintained over a preset time period.

20. The data recording device as claimed in claim 19 wherein the processor further drives the write component to write at the third write speed after the third write speed is set.

* * * * *